United States Patent
Lousenberg et al.

(10) Patent No.: US 10,639,591 B1
(45) Date of Patent: May 5, 2020

(54) THIN-FILM COMPOSITE MEMBRANE AND PROCESSES FOR THE SEPARATION OF ALKENES FROM A GASEOUS FEED MIXTURE

(71) Applicant: Compact Membrane Systems, Inc., Newport, DE (US)

(72) Inventors: Robert Daniel Lousenberg, Wilmington, DE (US); Kenneth Evan Loprete, Philadelphia, PA (US)

(73) Assignee: COMPACT MEMBRANE SYSTEMS, INC., Newport, DE (US)

( * ) Notice: Subject to any disclaimer, the term of this patent is extended or adjusted under 35 U.S.C. 154(b) by 0 days.

(21) Appl. No.: 16/381,333

(22) Filed: Apr. 11, 2019

Related U.S. Application Data

(60) Provisional application No. 62/789,276, filed on Jan. 7, 2019.

(51) Int. Cl.
| | | |
|---|---|---|
| *B01D 69/12* | (2006.01) | |
| *B01D 69/02* | (2006.01) | |
| *B01D 53/22* | (2006.01) | |
| *B01D 71/36* | (2006.01) | |
| *B01D 71/82* | (2006.01) | |
| *B01D 67/00* | (2006.01) | |
| *B01D 69/10* | (2006.01) | |

(52) U.S. Cl.
CPC ......... *B01D 69/125* (2013.01); *B01D 53/228* (2013.01); *B01D 69/02* (2013.01); *B01D 71/36* (2013.01); *B01D 71/82* (2013.01); *B01D 67/0093* (2013.01); *B01D 69/10* (2013.01); *B01D 2257/702* (2013.01); *B01D 2323/08* (2013.01); *B01D 2323/30* (2013.01); *B01D 2325/04* (2013.01); *B01D 2325/20* (2013.01)

(58) Field of Classification Search
CPC .. B01D 53/22; B01D 53/228; B01D 67/0093; B01D 69/02; B01D 69/10; B01D 69/12; B01D 69/125; B01D 71/32; B01D 71/36; B01D 71/82; B01D 2325/04
See application file for complete search history.

(56) References Cited

U.S. PATENT DOCUMENTS

| | | | | |
|---|---|---|---|---|
| 5,191,151 A | * | 3/1993 | Eriksen .............. | B01D 67/0093 585/818 |
| 2006/0223894 A1 | * | 10/2006 | Ghielmi ................. | B01D 71/32 521/27 |
| 2010/0319535 A1 | * | 12/2010 | Joshi ...................... | B01D 53/22 95/52 |
| 2015/0025293 A1 | * | 1/2015 | Feiring ................ | B01D 53/228 585/818 |
| 2016/0045859 A1 | * | 2/2016 | Zhang .................. | B01D 53/228 95/47 |
| 2018/0085714 A1 | * | 3/2018 | Shangguan ............ | B01D 71/32 |
| 2018/0111098 A1 | * | 4/2018 | Majumdar ........... | B01D 53/228 |
| 2018/0134638 A1 | * | 5/2018 | Koizumi .............. | B01D 53/228 |

OTHER PUBLICATIONS

Van Zyl et al., A.J., "Influence of oxygen-containing hydrocarbons on the separation of olefin/paraffin mixtures using facilitated transport", Journal of Membrane Science, 133, 1997, pp. 15-26. (Year: 1997).*

"Aquivion(R) PFSA", 12 pages, retrieved from https://www.solvay.com/en/brands/aquivion-pfsa on Jul. 24, 2019. (Year: 2019).*

* cited by examiner

*Primary Examiner* — Jason M Greene
(74) *Attorney, Agent, or Firm* — Devlin Law Firm LLC; James M. Lennon

(57) ABSTRACT

This invention discloses an improved thin-film composite membrane and processes that use the membrane for the separation of gaseous mixtures that include an alkene. The membrane is particularly useful for separation of alkenes from alkanes or the separation of alkenes from other non-hydrocarbon gases. The membrane has a more mechanically durable and defect-free gas-separation layer that is fabricated from an ionomer solution that is substantially free of dissolved ionic species not associated with the ionomer and the mean helium permeability of the thin-film composite membrane is less than two times greater than the intrinsic helium permeability of the gas-separation layer.

21 Claims, 2 Drawing Sheets

US 10,639,591 B1

THIN-FILM COMPOSITE MEMBRANE AND PROCESSES FOR THE SEPARATION OF ALKENES FROM A GASEOUS FEED MIXTURE

CROSS REFERENCE TO RELATED APPLICATIONS

This application claims the benefit of priority to U.S. Provisional Patent Application No. 62/789,276, filed on Jan. 7, 2019.

GOVERNMENT RIGHTS

This invention was made with government support under DE-SC0007510 awarded by the Department of Energy. The government has certain rights in the invention.

FIELD OF THE INVENTION

A thin-film composite membrane that has one or more layers of a certain type of silver-sulfonate ionomer; and processes using the membrane for the separation of gaseous feed mixtures comprising an alkene is disclosed.

BACKGROUND

Industrial separations of normally gaseous alkenes from alkanes and separations of alkenes from other non-hydrocarbon gases by traditional methods such as distillation can be challenging due to their low and often similar boiling points. Notably challenging are separations of compounds having the same number of carbon atoms, such as ethylene from ethane, propylene from propane, and butane from butane. Similar boiling points necessitate large-scale capital-intensive facilities and high energy input for effective separation, which may involve cryogenic distillation conditions. Membrane separation processes may be less expensive and require significantly less energy. Thin-film composite membranes that incorporate ionomers may be used for facilitated transport of alkenes.

Membranes comprising gas-separation layers of silver salts of certain ionomer containing polymers, especially fluorinated polymers, have been shown to be useful for the separation of alkenes from alkanes or from other non-hydrocarbon gases. One might assume that at a minimum a membrane consisting solely of gas-separation layer of a silver ionomer would be useful. However, fluorinated ionomers incorporating silver can be costly and the alkene flux, which is the rate at which the alkene permeates through the membrane per unit area, would be impractically low for a necessarily thick membrane that is mechanically strong. A membrane composite can overcome these limitations and usually comprises a thin gas-separation layer and other layers of dissimilar materials contacted together in combination to form a single composite construction that optimize and improve the composite membrane performance and durability. The use of various membranes and certain reinforced composites comprising a gas-separation layer of a silver ionomer for facilitated transport of alkenes and the separation of alkenes from alkanes have been described. See for example A. van Zyl, et al. in *Journal of Membrane Science* 1997 133 15-26, 0. I. Eriksen, et al. in *Journal of Membrane Science* 1993 85 89-97, A. van Zyl *Journal of Membrane Science* 1997 137 175-185, and U.S. Pat. No. 5,191,151.

Eriksen et al. disclosed composite membranes for the separation of alkenes from alkanes in the third embodiment of the invention in U.S. Pat. No. 5,191,151. The composite membranes comprise gas separation materials of perfluorinated ionomers that are copolymers of tetrafluoroethylene and a perfluorovinyl ether containing a terminal sulfonic acid group, such as Nafion® (Chemours, Wilmington Del.). The sulfonic-acid ionomers as 5% solutions in lower alcohols/water were modified by mixing with at least one silver compound under such conditions to obtain a solution comprising a silver-exchanged copolymer (and also the conjugate acid of the anion from the silver compound). Highly soluble and "ionizable" silver compounds such as $AgBF_4$, $AgClO_4$, and $AgNO_3$ (preferred) were used at ratios of g-equivalents of silver to g-equivalents of sulfonic-acid groups (present in the ionomer) in the range of 0.5:1 to 50:1, preferably at about 1:1 to stoichiometric excesses of about 40:1. Membranes with thicknesses from 0.1 to 400-µm were disclosed and composite membranes I and J, having 20 and 30-µm thicknesses, respectively, were enabled in Example 5 by casting onto porous-layer substrates having 0.2-µm average pore diameters. The membranes were presumably interpenetrating composites due to the relatively large pores of the substrate.

As taught by Eriksen et al., we attempted to fabricate laminar composite membranes with significantly (10×) thinner (≤2-µm) gas-separation layers for anticipated commercially attractive alkene permeance and lower costs. Ionomer solutions were prepared by dilution of commercially available Nafion® D2020, with added dissolved silver nitrate, and membranes were cast onto a polyvinylidine fluoride porous-layer support having order-of-magnitude smaller pore diameters of approximately 0.02-µm. Gas testing indicated that membranes were laminar composites, but many were defective and had low or no alkene over alkane selectivity due to suspected "pinholes." The defective membranes had excessively high helium permeability that was likely due to incomplete pore-bridging of the support and a mechanically fragile gas-separation layer. We recognized that membranes cast from mixtures of ionomer and dissolved ionic compounds, not associated with the ionomer, can be inherently fragile due to hindered and incomplete film coalesce. See for example S. D. Minteer et al. in *Journal of Membrane Science* 2003 213 55-66. Such prepared membranes are not very mechanically durable and cannot be easily and consistently fabricated defect-free into larger, more complex, and commercially relevant geometries such as spiral-wound membrane modules.

SUMMARY OF THE INVENTION

This invention discloses an improved thin-film composite membrane and processes that use the membrane for the separation of a gaseous feed composition comprising an alkene; and comprising the following steps of:
1. providing a thin-film composite membrane having a feed side and a permeate side; the membrane comprising,
    a) a porous-layer support, and;
    b) a gas-separation layer comprising a silver-sulfonate ionomer; said gas-separation layer is coplanar and in direct contact to said porous-layer support, and;
2. exposing the membrane feed-side to a flowing gaseous composition comprising an alkene, and;
3. providing a driving force and producing a composition at the membrane permeate-side having a higher concentration of alkene than the membrane feed-side; and wherein the improvement comprises a more durable gas-separation layer that is formed from an ionomer solution that is substantially free of dissolved ionic species not associated with the ionomer and the mean helium permeability of the thin-film composite membrane is less than two times greater than the intrinsic helium permeability of the gas-separation layer.

The thin-film composite membrane of the invention is useful for the separation of gaseous feed compositions comprising an alkene and includes alkene separation from components such as alkanes and non-hydrocarbon gas such as helium, hydrogen, nitrogen, oxygen, and argon. The membrane is more mechanically durable, and comprises an improved gas-separation layer that is also more durable and substantially defect-free, as a result of its formation using an ionomer solution that is substantially free of dissolved ionic species not associated with the ionomer. That is, there are no or minimal amounts of other ionic species dissolved with the ionomer at concentrations that may adversely affect formation of the gas-separation layer. The gas-separation layer may be predominantly laminar and can appear shiny and transparent. A subtle light interference "rainbow" effect, which can be observed for certain thicknesses, was additional evidence for its laminar nature. Furthermore, the thin-film composite membrane can be fabricated into complex and commercially relevant geometries, such as spiral-wound membrane modules that have large surface areas.

Ionomer pore bridging of a porous-layer support is improved with the absence of other dissolved ionic species not associated with the ionomer in solution. More specifically, the ionomer reduced viscosity which correlates with molecular size in solution, is maximized with minimal or no other concentrations of dissolved ionic species. This is due to increased double layer forces and charge repulsion along the ionomer chain, which causes the chain to adopt a more expanded conformation in solution. See for example T. Kitano et al. in *Macromolecules* 1980 13 (1) 57-63, which is hereby incorporated by reference. It was also discovered that certain perfluorinated ionomers were highly advantageous for formation of the gas-separation layer. For example, commercially available Aquivion® (Solvay, Houston Tex.) having a 720 equivalent weight had the highest measured solution viscosity.

Formation of a substantially defect-free and laminar gas-separation layer in the thin-film composite membrane was evidenced by measured helium permeability where the mean permeability was close to and less than two times greater than the known intrinsic helium permeability for the gas-separation layer material. For example, Nafion® and Aquivion® both have intrinsic helium permeably between 18 and 27-Barrer at 25° C. to 35° C., respectively, under dry conditions. These were measured using thick films (160 and 153-µm) of the sulfonic-acid ionomers. See for example, J. Catalano et al. in *International Journal of Hydrogen Energy* 2012 37 6308-6316 for Nafion® and Aquivion® intrinsic permeability and which is hereby incorporated by reference. Furthermore, helium permeability distributions herein calculated from measurements of multiple separate samples of the composite membranes were relatively narrow whereas the distributions for composite membranes prepared as taught by Eriksen et al. were much broader and shifted to higher mean permeability that was at least two times greater than the intrinsic permeability due to a higher defect rate.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention. Herein certain terms are used and they are further defined in the description of the invention.

BRIEF DESCRIPTION OF THE DRAWINGS

The accompanying figures are included to provide a further understanding of the invention and are incorporated in and constitute a part of this specification. The figures illustrate embodiments of the invention and together with the description serve to explain the principles of the invention.

Figure 1:
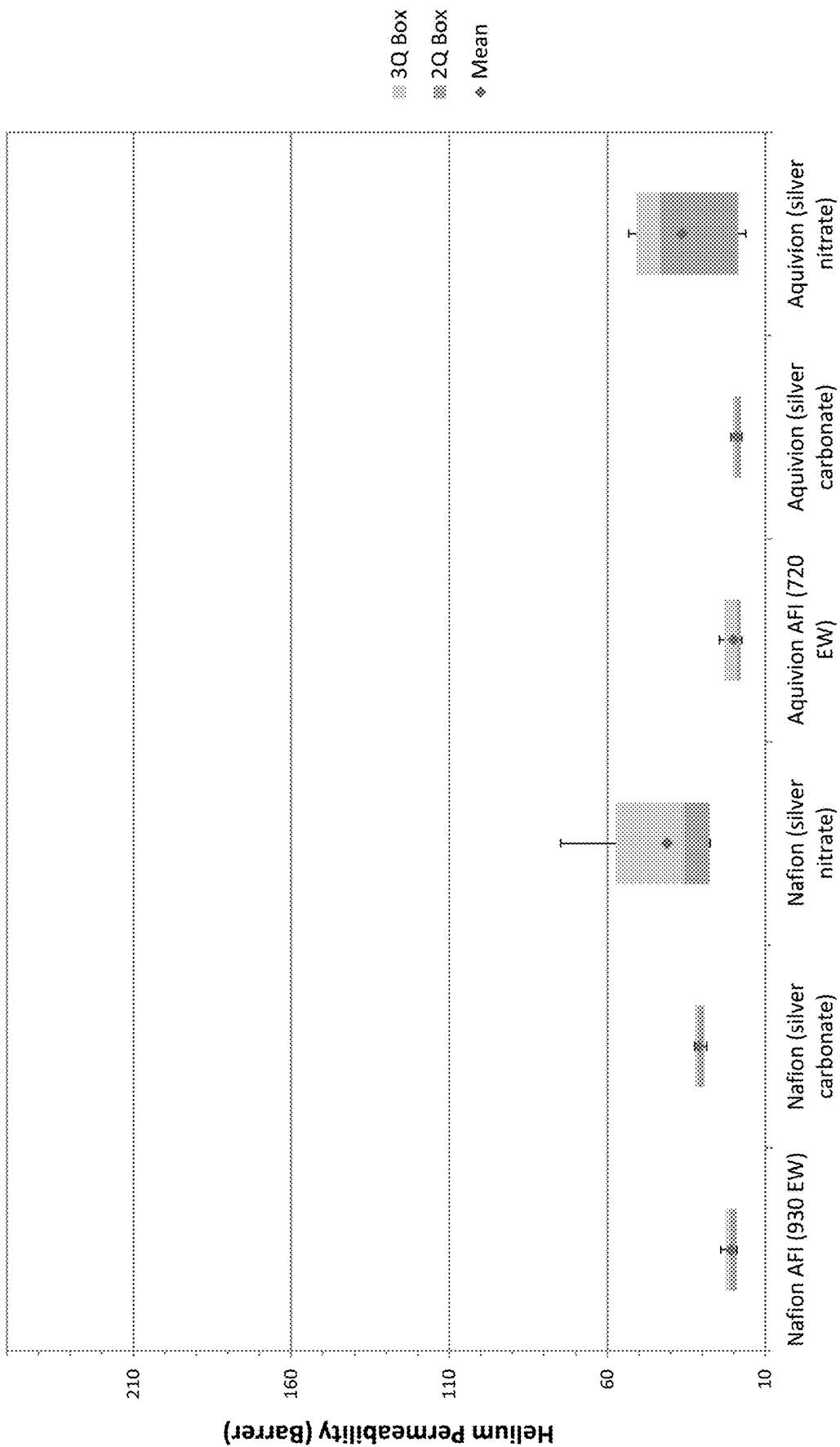
FIG. 1 shows a box and whisker plot of helium permeability for the initial "as made" thin-film composite membranes.

Corresponding reference characters indicate corresponding parts throughout the several views of the figures. The figures represent an illustration of some of the embodiments of the present invention and are not to be construed as limiting the scope of the invention in any manner. Furthermore, the figures are not necessarily to scale and some features may be exaggerated to show details of particular components. Also, specific structural and functional details disclosed herein are not to be interpreted as limiting, but merely as a representative basis for teaching one skilled in the art to variously employ the present invention.

DETAILED DESCRIPTION OF THE INVENTION

Ionomers are useful materials for formation of the gas-separation layer of the thin-film composite membrane of the invention. An ionomer is a copolymer that contains covalently-bound ionic-pendant groups such as sulfonic acid, sulfonate, carboxylic acid, carboxylate, phosphate, phosphonium, or ammonium. The ionomer equivalent weight is the weight of ionomer containing one mole of sulfonate group. The ionomer equivalent weight (EW) is preferably less than 5000 grams per mole, more preferably less than 2000, and very preferably between 500 and 800-g/mole.

Ionomers that are copolymers containing sulfonic acid or sulfonate groups are preferred ionomers useful for fabrication of the gas-separation layer. Such ionomers are well known in the art, and in some instances are known to separate alkenes from alkanes. See for examples A. van Zyl et al. in *Journal of Membrane Science* 1997 133 15-26, O.

I. Eriksen, et al. in *Journal of Membrane Science* 1993 85 89-97, A .van Zyl, *Journal of Membrane Science* 1997 137 175-185, and U.S. Pat. No. 5,191,151, all of which are hereby incorporated by reference. The preferred ionomers comprise repeat units A and B in which A is a polymerized derivative of a fluorinated monomer and B comprises sulfonate groups. The ionomers preferably contain 50% or more carbon-fluorine groups to carbon-fluorine groups plus carbon-hydrogen groups. More preferred ionomers are fluoropolymers in which there are no carbon-hydrogen groups in the polymer-backbone repeating units. Examples of the latter ionomers include copolymers comprising polymerized repeat units of tetrafluoroethylene and a perfluorovinyl ether monomer, having a pendant sulfonate group such as for example Nafion® (Chemours, Wilmington Del.), and Aquivion® (Solvay, Houston Tex.).

The gas-separation layer is fabricated from an ionomer solution that is substantially free of other dissolved ionic species not associated with the ionomer. Other ionic (cationic or anionic) species not associated with the ionomer comprise an ion where the counter ion is not covalently bound to the ionomer. A substantially-free ionomer solution has concentrations of other cationic species at molar ratios to ionomer sulfonate-groups ($-SO_3^-$) that are between 0 and less than 0.37, which is also less than the equivalent minimum 0.5:1 ratio of g-equivalents of silver (from the added silver compound) to g-equivalents of $-SO_3^-$ groups as disclosed in U.S. Pat. No. 5,191,151. The substantially-free ionomer solution may comprise more than one type of ionomer, or associated counter ions. For example, an ionomer solution comprising covalently bound sulfonate groups may have associated counter ions that are different from silver such as for example $H^+$, $Na^+$, $K^+$, ammonium, alkyl ammonium, or mixtures therefrom. The different counter ions may be exchanged for silver to activate the thin-film composite membrane after fabrication.

Sulfonic-acid or silver-sulfonate ionomer solutions that have trace or zero concentrations of other dissolved ionic species not associated with the ionomer are preferred ionomer solutions for fabrication of the gas-separation layer. Furthermore and for example, such a solution comprising a silver-sulfonate ionomer may be prepared from the sulfonic-acid ionomer solution by mixing with an essentially insoluble silver compound such as silver carbonate to effect a heterogeneous acid-base reaction to form the silver-sulfonate ionomer solution, carbon dioxide, and water. The reaction is effectively complete when insoluble silver carbonate is no longer consumed, $CO_2$ bubbles are no longer generated, and the solution pH is ≥5 to wet pH paper. Any excess insoluble silver carbonate may be separated from the ionomer solution by techniques such as filtration or centrifugation. The silver-sulfonate ionomer solution is stable for weeks to months at room temperature if properly stored in the absence of light.

The ionomer solution that is substantially free of other dissolved ionic species not associated with the ionomer may be diluted with a solvent or solvent mixture to a more desirable concentration prior to silver-sulfonate formation or gas-separation layer fabrication. Suitable solvents or solvent mixtures are those that dissolve the ionomer and evaporate at an appropriate rate to form the gas-separation layer in a timely manner. For example, suitable solvents include but are not limited to lower alcohols such as ethanol, isopropanol, n-propanol, certain ketone, ether, amide, and ester solvents, and mixtures therefrom. Certain mixtures of the preceding solvents with fluorinated solvents such as Novec® HFE7200, and HFE7300 are also suitable. Ionomer concentrations that are less than 5% are preferred for gas-separation layer fabrication, more preferably 2% or less.

Solution casting is a preferred membrane fabrication technique to form the gas-separation layer of the thin-film composite membrane. Preferred solution casting techniques include but are not limited to ring casting, dip-coating, spin-coating, slot-die coating, and Mayer-rod coating. The ionomer solution is cast onto a suitable surface comprising a porous-layer support and the solvent(s) are evaporated to form the "dry" gas-separation layer. Residual or trace solvent remaining in the gas-separation layer should not interfere with subsequent processing steps. The gas-separation layer thickness has a significant influence on the membrane cost and productivity of the separation process per unit area. The gas-separation layer is thin and its thickness is preferably 0.01-μm to 5-μm, more preferably 0.1-μm to 2-μm, and most preferably 0.5-μm to 2-μm. The gas-separation layer thickness is optimized such that both the alkene permeance through the thin-film composite membrane and selectivity over other gases is high per unit area. Gas permeance or GPU has units of $10^6 \times cm^3$ (STP)/$cm^2$/sec/cmHg while permeability, which is normalized for thickness and reported in Barrer, has units of $10^{10} \times cm^3$ (STP)$\times cm/cm^2$/sec/cmHg.

The porous-layer support may be in the form of a flat sheet, hollow fiber, or tube. The porous-layer support reinforces the thin gas-separation layer and helps to further mechanically strengthen the thin-film composite as a whole such that the membrane may be fabricated into more complex geometries such as spiral-wound or hollow-fiber membrane modules. The porous-layer support may also comprise an even stronger backing material such as porous non-woven polyester or polypropylene. Suitable porous-layer support materials include but are not limited to polyvinylidine fluoride, expanded polytetrafluoroethylene, polyacrylonitrile, polysulfone, and polyethersulfone. Porous inorganic substrates such as porous silica or alumina are also suitable support materials. Permeate gases should flow relatively unobstructed through the usually much thicker porous-layer support having a preferred porosity that is 40% or greater. The porous-layer support average pore size is preferably less 0.1-μm and more preferably between 0.01 and 0.03-μm.

The gas-separation layer in the thin-film composite membrane is coplanar and in direct contact with the porous-layer support. The gas-separation layer may also be predominantly laminar. By "predominantly laminar" is meant that the surface or interfaces of two or more distinct layers have 50% or more of at least one layer material not interpenetrating the pores of another layer. In contrast, the interfaces of two or more layer materials in a "predominantly interpenetrating" composite are highly irregular with the materials penetrating each other to an extent that they may not be easily distinguishable as separate layers. Predominantly interpenetrating layers have 50% or more of at least one layer material within another layer.

The gas-separation layer in the thin-film composite membrane may be subjected to a thermal treatment step "annealed" to further improve mechanical durability, long-term alkene permeance and selectivity, and resistance to degradation from contact with liquid water. The ionomer in the gas-separation layer is annealed by heating the thin-film composite membrane to near or above the glass transition temperature of the ionomer. The exact glass transition temperature will be dependent on the ionomer composition and the associated counter ion. Generally, annealing temperatures are between 50 and 200° C., and preferably between 50 and 150° C. The gas-separation layer is preferably heated for 0.1 to 10 minutes, more preferably for 1 to 5 minutes. The appropriate annealing temperature and time should not degrade the other components of the thin-film composite membrane.

The gas-separation layer comprising sulfonic-acid, or sulfonate-salt groups other than silver sulfonate, is initially inactive. That is, the thin-film composite membrane is not significantly perm-selective for alkenes over alkanes (selectivity 5) for example and the alkene permeance is low (<25-GPU). The thin-film composite membrane is activated by exchange of protons or other cations for silver in the gas-separation layer. For example, the exchange may be carried out by contacting the exposed gas-separation layer surface with a solution comprising water and a soluble and ionizable silver compound such as silver nitrate. It was discovered that a sufficient level of exchange quickly occurred for a thin gas-separation layer as evidenced by the observed high permeance (>100-GPU) and selectivity (>25) for propylene over propane after less than 1 minute of contact with aqueous silver nitrate at ambient (20 to 25° C.) temperature.

The thin-film composite membrane is highly useful for the separation of alkenes from alkanes and for separation of alkenes from other non-hydrocarbon gases such as helium, hydrogen, nitrogen, or argon. The membrane feed-side is exposed to a flowing gaseous composition comprising an alkene. A "driving force" is provided in which the alkene pressure on the membrane feed-side is higher than on the membrane permeate side. Separation of the alkene in the gaseous composition occurs through the membrane producing a composition at the membrane permeate-side having a higher concentration of alkene than the membrane feed-side. Separation may also be enhanced by having water vapor in the composition and/or by using a sweep gas on the membrane permeate-side, which functions to reduce the permeate concentration. For example, a sweep gas may comprise an inert gas such as water vapor or nitrogen.

EXAMPLES

Example 1

Nafion® and Aquivion® Solution Preparation:

2%-w/w solutions were prepared by isopropanol dilution of commercially available Nafion® D2020 acid-form ionomer solutions (Ion Power, New Castle, Del.) and Aquivion® D72-25BS, D79-25BS, and D98-25BS solutions (Sigma-Aldrich, St. Louis, Mo.). The diluted solutions were filtered through a glass microfiber filter, having a porosity of approximately 1-μm, and characterized for concentration by gravimetric drying (5-g samples) to constant weight on a 110° C. hot plate. Nafion® ionomer had an equivalent weight) of approximately 930-g/mole and the Aquivion® ionomers had equivalent weights of 720, 790, and 980-g/mole, respectively.

Example 2

Silver Ionomer Solution Formation:

Separate quantities of each of the 2% acid-form ionomer solutions prepared in Example 1 were converted to the silver-sulfonate ionomer solution by either equilibrium exchange with silver nitrate or by reaction with insoluble silver carbonate. Using silver nitrate, approximately 1 molar equivalent of silver nitrate to sulfonic-acid groups in the ionomer solution was dissolved with magnetic stirring. The solutions were subsequently filtered through 1-μm glass microfiber. Using silver carbonate, acid-form ionomer solutions were magnetically stirred for at least 15 minutes with a 10 to 25% molar excess of silver carbonate to sulfonic-acid groups. The solutions were subsequently filtered through 1-μm glass microfiber to remove excess insolubles, resulting in a solution that was substantially free of dissolved ionic species not associated with the silver-sulfonate ionomer. All silver-sulfonate ionomer solutions were stored away from light sources prior to and between uses.

Example 3

Reduced Viscosity of Sulfonic Acid and Silver-Sulfonate Ionomer Solutions:

Portions of the 2% acid-form ionomer (AFI) and silver-sulfonate ionomer solutions prepared in Examples 1 and 2, respectively, were quantitatively diluted to 1% concentrations with isopropanol. Kinematic viscosities were measured using an Ubbelohde capillary viscometer (size 1) in a temperature controlled (25° C.) water bath. Solution densities (g/mL) were measured volumetrically and dynamic viscosities ($\eta$) were calculated from the product of density and kinematic viscosity for each solution and the isopropanol solvent ($\eta_{sol}$). The reduced viscosities, which are normalized for ionomer concentration (c) in grams per deciliter (g/dL), were calculated as: $\eta_{red}=(\eta/\eta_{sol}-1)/c$. The reduced viscosities are listed in Table 1 and are known from theory to correlate to the ionomer molecular size in solution. The results showed that the AFI solutions had the highest reduced viscosities and correspondingly largest molecular size in solution. Reduced viscosities for Aquivion® having 720 and 790 equivalent weights were higher than Nafion®. Reduced viscosities were lowest and approximately 3 times lower than the AFI solutions when other dissolved ionic species, herein nitric acid from exchange with silver nitrate, were also present in the solution.

TABLE 1

| Ionomer solution | Equivalent weight (g/mole) | Silver addition method | Reduced viscosity, $\eta_{red}$ (dL/g) |
|---|---|---|---|
| Aquivion ® AFI | 720 | n/a | 1.37 |
| Aquivion ® | 720 | carbonate | 0.620 |
| Aquivion ® | 720 | nitrate | 0.513 |
| Aquivion ® | 790 | carbonate | 0.579 |
| Aquivion ® | 980 | carbonate | 0.180 |
| Nafion ® AFI | 930 | n/a | 0.921 |
| Nafion ® | 930 | carbonate | 0.446 |
| Nafion ® | 930 | nitrate | 0.276 |

Example 4

Thin-Film Composite Membrane Fabrication on Porous-Layer Support:

A 120-cm×45-cm sheet of polyvinylidine fluoride (PVDF) porous-layer support, having a 0.02-μm mean porosity, 40-μm thickness, and supported on a non-woven polyester backing, was prepared for casting. The PVDF sheet was tacked down at the edges on a flat and level glass surface that was contained in a ventilated enclosure. A 35-cm×#30 Meyer rod with an attached reservoir trough was placed at one end of the PVDF. The trough was filled with up to 60-mL of a selected acid-form ionomer solution from Example 1 or silver sulfonate ionomer solution from Example 2. The Meyer rod was then slowly drawn down the PVDF support at a rate sufficient to maintain a small solution-front ahead of the rod. The membrane was dried undisturbed on the casting surface at ambient temperature for at least one hour to overnight. Selected membranes were heat treated "annealed" to strengthen the gas-separation layer as described further herein. Most of the dry membrane area was used for spiral module fabrication. The remaining membrane area was tested for initial helium permeability while some samples were also selectively tested for initial separation performance of propylene from propane as also described further herein.

Example 5

Estimation of Gas-Separation Layer Thickness

The gas-separation layer (GSL) thickness was estimated from the "wet" solution film weight, the ionomer solution concentration ([ionomer %]), the wet-film area, and the ionomer density (p). Nafion® has a literature reported density of 1.97-g/cm$^3$ while Aquivion® has a reported density of 2.06-g/cm$^3$. The gas separation layer thicknesses were calculated using the following equation (1) and were less than 2-μm with most approximately 1-μm.

$$GSL \text{ thickness (μm)} = \frac{\text{wet film (g)} \times [\text{ionomer \%}] \times 100}{\rho \text{ (g/cm}^3) \times \text{wet film area (cm}^2)} \quad (1)$$

Example 6

Simulated Spiral Module Fabrication:

A 30-cm×100-cm piece of a thin-film composite membrane prepared in Example 4 was folded in half with the gas-separation layer facing inwards. A 30-cm×50-cm polypropylene-mesh feed spacer was then inserted between the two gas-separation layer surfaces. Separately, the short side of a 30-cm×80-cm polypropylene-mesh permeate spacer was aligned to a 30-cm L×1.5-cm diameter perforated-core tube. The folded membrane with feed spacer was then aligned length-wise on top of the permeate spacer with the folded end nearest the core tube. The membrane and spacers were then tightly wound together without glue and under tension around the core tube to form the spiral module. The outside diameter was then wrapped with tape to hold the module together. After several hours, the tape was removed, and the module was unwound to isolate the membrane for further testing.

Example 7

Thin-Film Composite Membrane Helium Permeability Measurement:

47-mm diameter membrane samples were randomly punched from a given membrane. For the initial "as made" membranes of Example 4, five separate samples were tested for helium while twelve separate samples from a spiral module membrane of Example 6 were tested. The sample membranes having a 13.85-cm$^2$ active area (A) were sealed in a stainless-steel cross-flow cell with feed/retentate and sweep/permeate ports. The membrane was oriented so that the gas-separation layer faced the feed/permeate. The sweep port was blocked off for the helium measurement and the retentate outlet was connected to a rotameter with needle valve for flowrate control. The permeate flowrate ($F_P$) was measured using an Agilent ADM1000 acoustic flowmeter. Helium was supplied to the feed inlet at pressures (P) of 30 and 60-psig and the retentate outlet flowrate was approximately 125 or 250-mL/min, respectively. Membrane samples were equilibrated for at least 1 minute at a given pressure before recording the permeate flowrate. The helium permeability, corrected for temperature (K) to STP conditions, was calculated, using the estimated gas-separation layer thickness (T), from the following equation (2):

$$\text{Permeability (Barrer)} = 0.96 \times 10^6 \times \frac{F_P(\text{mL min}^{-1}) \times T(\mu m)}{P(\text{psig}) \times A(\text{cm}^2) \times K(\text{Kelvin})} \quad (2)$$

Example 8

Thin-Film Composite Membrane Initial Helium Permeability:

Table 2 summarizes initial mean helium permeabilities and standard deviations for the gas-separation layers of membranes from either Nafion® or Aquivion® and certain respective silver-sulfonate ionomers. Gas-separation layers from acid-form ionomers (AFI) at 20.1, and 20.9, respectively, were in good agreement within standard deviations for the previously identified literature values of 18 to 22 Barrers. The excessively high permeability for Aquivion® having a 980 equivalent weight was likely due to a relatively low reduced viscosity and corresponding low ionomer molecular size in solution as received, which resulted in incomplete pore bridging during gas-separation layer formation. Furthermore, FIG. 1 shows a box and whisker plot of helium permeability distributions for Nafion® and Aquivion® (720 equivalent weight) membrane samples. Therein, the 2Q and 3Q boxes represent the $2^{nd}$ and $3^{rd}$ quartile ranges, respectively, for the statistically calculated distributions, while the positive and negative whiskers represent the data range about the mean. Permeability distributions were relatively narrow for gas-separation layers from acid-form and silver-sulfonate (from silver carbonate) ionomers. The mean permeability agreement with literature precedent indicated that these membranes were predominantly laminar and their narrow distributions indicated that they were largely free of defects. In contrast, the mean permeability was notably higher and distributions much broader as a result of a higher defect rate for gas-separation layers formed from solutions that were mixtures of the acid-form ionomer and silver nitrate.

TABLE 2

| Gas-separation Layer Construction | Equivalent Weight (g/mole) | Mean Helium Permeability (Barrer) | Permeability Standard Deviation (Barrer) |
|---|---|---|---|
| Nafion ® AFI | 930 | 21 | 2 |
| Nafion ® (silver carbonate) | 930 | 31 | 2 |
| Nafion ® (silver nitrate) | 930 | 41 | 20 |
| Aquivion ® AFI | 720 | 20 | 3 |
| Aquivion ® (silver carbonate) | 720 | 19 | 1 |
| Aquivion ® (silver nitrate) | 720 | 36 | 17 |
| Aquivion ® (silver carbonate) | 790 | 18 | 1 |
| Aquivion ® (silver carbonate) | 980 | 233 | 64 |

Example 9

Figure 2:
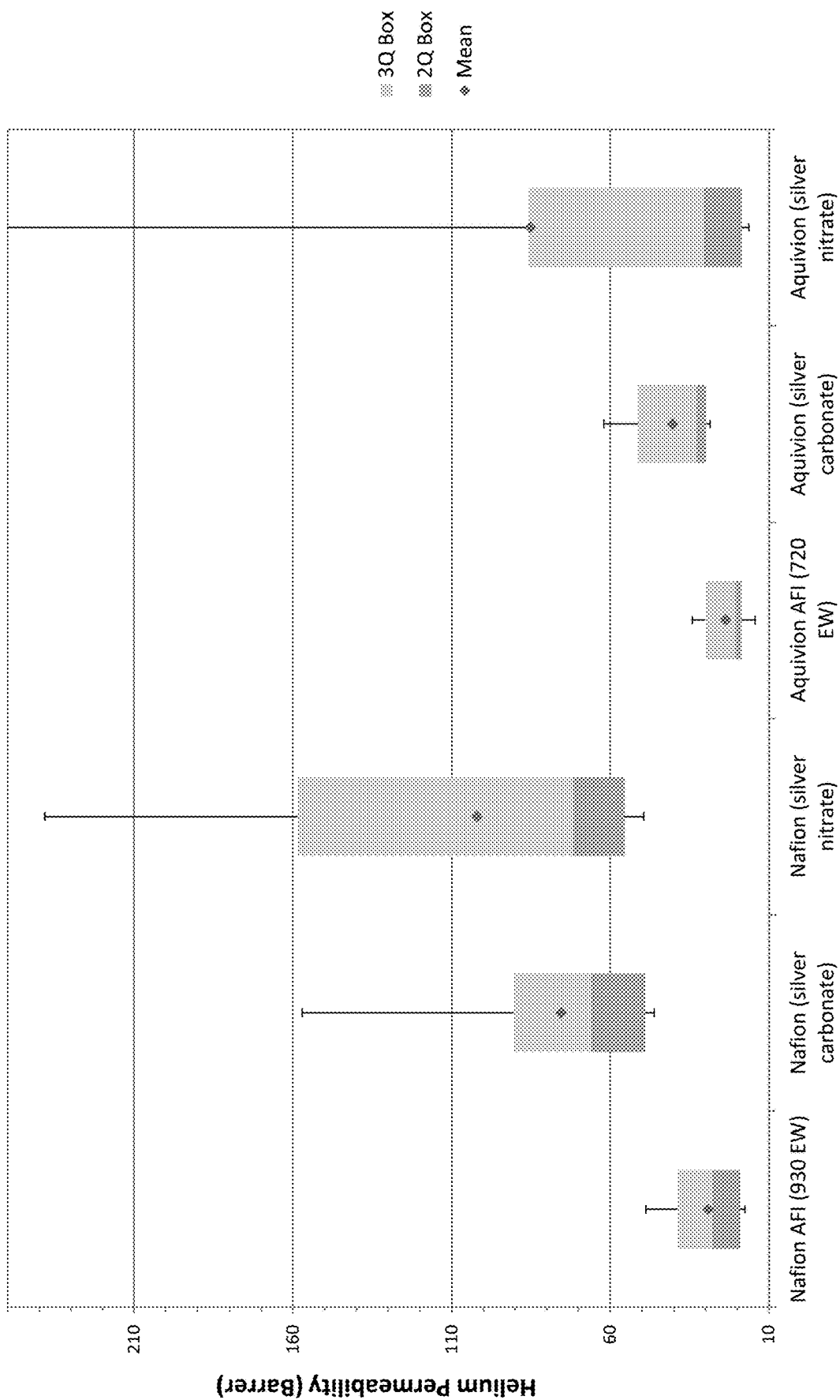
FIG. 2 shows a box and whisker plot of helium permeability for the thin-film composite membranes after spiral module fabrication.

Spiral Membrane Helium Permeability:

FIG. 2 shows a box and whisker plot for the membrane permeability distributions after spiral module fabrication using Nafion® and Aquivion® (720 EW). The mean helium permeability had increased for all membranes after spiral manufacture and appeared to be inversely correlated with the ionomer solution reduced viscosity. Permeability distributions for all acid-form (AFI) and the Aquivion® (silver-carbonate) ionomer gas-separation layers remained relatively narrow and indicated that these were still predominantly defect-free after spiral fabrication. However, the helium-permeability statistical distributions were significantly broader for gas-separation layers fabricated from solutions that were mixtures with soluble silver nitrate, wherein the ionomer intrinsic viscosity was lowest. These gas-separation layers were compromised such that the membrane may be considered as failed when used in a spiral module and will not have a sufficient and commercially viable selectivity for separations of alkenes.

Example 10

Thin-Film Composite Membrane Alkene Permeance Measurement and Selectivity Over Alkane or Nitrogen:

A 47-mm dia. thin-film composite membrane sample was punched from a larger membrane area. The membrane having a 13.85-cm² active area (A) was placed in the stainless-steel cross-flow test as described in Example 8. The cell was placed in a well-ventilated testing apparatus and gas lines were connected to the various ports. The feed comprised a gaseous mixture of an alkene (polymer grade ethylene or propylene, 99.5%) and an alkane (propane, 99.9%) or a mixture of the alkene and nitrogen. Each gas was supplied from separate cylinders, fed through separate mass flow controllers, and then mixed. Standard feed compositions were 20-mol % alkene with 80-mol % alkane or 50% alkene with 50% nitrogen at a total mass flow rate of approximately 200-ml/min. The mixtures were passed through a water bubbler to humidify the gas to greater than 90% relative humidity. A back-pressure regulator on the retentate line was used to control the feed pressure in the cell. The retentate gas was safely vented after exiting the back-pressure regulator. The total feed pressure ($p_F$) was normally 75 psia and alkene, alkane, or nitrogen partial pressures ($p_{Fi}$) in the feed were calculated from the total feed pressure and their respective mass (molar) flow rates ($m_{Fi}$) using equation (3) as follows.

$$P_{Fi} = P_F \times \frac{m_{Fi}}{\sum m_{Fi}} \quad (3)$$

Permeance measurements were carried out at ambient temperature and most were made without a permeate sweep gas. With a sweep, dry nitrogen was fed through a mass flow controller at 300-mL/min and then passed through a water bubbler to humidify the stream to greater than 90% relative humidity. A sweep volumetric flow rate ($F_S$) (nitrogen+water vapor) was measured near the sweep inlet. Permeate (and sweep) gases exited at the permeate outlet where the total volumetric flowrate ($F_P$) was measured. The permeate-gas volumetric-flow rate ($f_P$) was calculated as a difference of total flow rate at the permeate outlet and sweep-in flow rate ($f_P = F_P - F_S$). Without a sweep, $f_P$ was measured directly at the permeate outlet. The permeate pressure ($p_P$) was typically between 15 and 16.5-psia. A Varian® 450 gas chromatograph (GC) with a GS-GasPro capillary column (30 m×0.32 mm) was used to measure the fraction ($c_i$) of alkene and alkane (and nitrogen) in the permeate. The corresponding permeate-component flow rates were: $f_{Pi}=f_P \times c_i$; and permeate-component partial pressures ($p_{Pi}$) were calculated using equation (4) as follows:

$$p_{Pi} = p_P \times \frac{f_{Pi}}{f_P} \quad (4)$$

The component flow rates were corrected to STP and the permeance of each component ($Q_i$) in gas permeance units (GPU=$10^{-6} \times cm^3/cm^2/sec/cmHg$) was from equation (5):

$$Q_i(GPU) = \frac{f_{Pi}(STP)}{A \times (p_{Fi} - p_{Pi})} \quad (5)$$

The selectivity of the membrane for alkene over alkane or nitrogen for a specific feed composition was calculated as the ratio of alkene to alkane or alkene to nitrogen.

Example 11

Thin-Film Composite Membrane Initial Separation of Propylene and Propane:

Multiple membrane samples having gas-separation layers comprising Nafion® and Aquivion® were tested for initial separation of propylene from propane, as outlined in Example 10 without a nitrogen sweep. Table 3 shows that membranes fabricated from ionomer solutions (silver carbonate) that were substantially free of other dissolved ionic species not associated with the ionomer, had propylene selectivity that was approximately 40 or higher. The negligible propylene selectivity for the 980 EW Aquivion® GSL was again likely due to a relatively low ionomer reduced viscosity, which resulted in incomplete pore bridging during GSL formation. However, membranes from ionomer mixtures with silver nitrate also had low propylene selectivity that was less than 10 due to a higher defect rate. The higher defect rate is also believed to have resulted from a lower ionomer molecular size in solution as evidenced by lower reduced viscosity and also hindered and incomplete film coalesce resulting in a more fragile gas-separation layer.

TABLE 3

| Gas-separation Layer Construction | Equivalent Weight (g/mole) | Propylene Permeance (GPU) | Propylene Selectivity |
|---|---|---|---|
| Nafion ® (silver carbonate) | 930 | 89 | 45 |
| Nafion ® (silver nitrate) | 930 | 130 | 7 |
| Aquivion ® (silver carbonate) | 720 | 152 | 39 |
| Aquivion ® (silver nitrate) | 720 | 290 | 3 |
| Aquivion ® (silver carbonate) | 790 | 102 | 43 |
| Aquivion ® (silver carbonate) | 980 | 248 | 1 |

Example 12

Gas-Separation Layer Activation by Silver Solution Contact and Propylene Permeance and Selectivity Over Propane:

The gas-separation layer of separate initial membrane samples fabricated from Aquivion® (720 EW) acid-form ionomer solution, as described in Example 2, were covered for different times with 0.5M aqueous silver nitrate and subsequently tested for propylene permeance and selectivity, as described in Example 10, using a nitrogen sweep. A control was prepared in which the gas-separation layer was briefly contacted with cold de-ionized water only. High permeance (>100-GPU) and selectivity (>50) was observed for all TCMs that were contacted with silver nitrate as shown in Table 4 and demonstrated that a level of exchange sufficient for high alkene permeance and selectivity over alkane was achieved in less than one minute.

TABLE 4

| Contact Time (s) | Propylene GPU | Propylene Selectivity |
|---|---|---|
| 1000 | 196 | 87 |
| 100 | 161 | 67 |
| 10 | 162 | 62 |
| ~1 to 2 | 179 | 78 |
| control | 23 | 5 |

Example 13

Activation of a 720EW Aquivion® of 930EW Nafion® Gas-Separation Layer and Helium and Propylene Permeance and Selectivity Over Propane:

The gas-separation layer of separate initial membrane samples fabricated from Aquivion® (720 EW) or Nafion® (930EW) acid-form ionomer solutions, as described in Example 2, were covered for 30 seconds with 0.14M aqueous silver nitrate and subsequently tested for helium and propylene permeance and selectivity over propane, as described in Examples 7 and 10 (without a nitrogen sweep), respectively. Table 5 shows that average helium permeability and propylene/propane selectivity were similar to membranes prepared from a silver sulfonate (silver carbonate) ionomer in Examples 8 and 11.

TABLE 5

| Sample | Helium Permeability (Barrer) | Propylene Permeability (Barrer) | Propylene Selectivity |
|---|---|---|---|
| Aquivion ® | 29.6 | 214 | 22 |
| Aquivion ® | 15.7 | 175 | 58 |
| Aquivion ® | 22.9 | 204 | 32 |
| Aquivion ® | 20.7 | 208 | 40 |
| Average (SDev) | 22 (6) | 200 (17) | 38 (15) |
| Nafion ® | 18.9 | 68.2 | 48 |
| Nafion ® | 30.5 | 114 | 40 |
| Nafion ® | 23.3 | 93.8 | 61 |
| Nafion ® | 47.5 | 183 | 29 |
| Average (SDev) | 30 (13) | 115 (49) | 45 (13) |

Example 14

Annealing and Activation of Gas-Separation Layer:

The gas separation layers of separate initial membrane samples fabricated from Aquivion® (720 EW) or Nafion® (930EW) acid-form ionomer (AFI) solutions, as described in Example 2, were annealed for 5 minutes at 130° C. in a forced air oven. After cooling to ambient room temperature, the samples were covered for 30 seconds with 0.14M aqueous silver nitrate and subsequently tested for helium and propylene permeance and selectivity over propane, as described in Example 10 (without a nitrogen sweep). Table 6 shows that average helium permeability and propylene/propane selectivity were again similar to membranes prepared from a silver sulfonate (silver carbonate) ionomer in Examples 8 and 11.

TABLE 6

| Sample | Helium Permeability (Barrer) | Propylene Permeability (Barrer) | Propylene Selectivity |
|---|---|---|---|
| Aquivion ® | 27.4 | 168 | 25 |
| Aquivion ® | 21.2 | 166 | 33 |
| Aquivion ® | 22.1 | 182 | 36 |
| Aquivion ® | 23.8 | 179 | 30 |
| Average (SDev) | 24 (3) | 174 (8) | 31 (5) |
| Nafion ® | 21.0 | 74.6 | 50 |
| Nafion ® | 31.6 | 79.2 | 21 |
| Nafion ® | 35.7 | 61.1 | 12 |
| Nafion ® | 25.6 | 63.8 | 28 |
| Average (SDev) | 29 (7) | 70 (9) | 28 (16) |

Example 15

Thin-Film Composite Membrane Separation of Ethylene from Nitrogen:

Separate membrane samples having gas-separation layers fabricated from Aquivion® (720 EW) or Nafion® (930EW) acid-form ionomer (AFI) solutions, as described in Example 2, were activated as described in Example 13 and tested for separation of ethylene from nitrogen as described in Example 10, without sweep. Table 7 shows the membrane ethylene permeability and selectivity over nitrogen.

TABLE 7

| Sample | Ethylene Permeability (Barrer) | Ethylene/$N_2$ Selectivity |
|---|---|---|
| Aquivion ® | 83.1 | 7.9 |
| Aquivion ® | 102.1 | 11.8 |
| Aquivion ® | 68.1 | 8.5 |
| Aquivion ® | 78.4 | 10.4 |
| Average (SDev) | 83 (14) | 10 (2) |
| Nafion ® | 58.7 | 9.4 |
| Nafion ® | 40.6 | 4.2 |
| Nafion ® | 48.2 | 5.3 |
| Nafion ® | 52.4 | 4.6 |
| Average (SDev) | 50 (8) | 6 (2) |

What is claimed is:

1. A thin-film composite membrane comprising:
    a) a porous-layer support; and
    b) a gas-separation layer comprising an ionomer comprising silver-sulfonate groups; said gas-separation layer is coplanar in direct contact to said porous-layer support, and predominantly laminar; and
    wherein the gas-separation layer is formed from an ionomer solution that is substantially free of dissolved ionic species not associated with the ionomer and a mean helium permeability of the thin-film composite membrane is less than two times greater than an intrinsic helium permeability of the gas-separation layer.

2. The thin-film composite membrane of claim 1 wherein the ionomer is comprised of repeat units A and B in which A is a polymerized derivative of a fluorinated monomer and B comprises silver sulfonate groups.

3. The thin-film composite membrane of claim 2 wherein repeat unit A is selected from a group consisting of: tetrafluoroethylene, chlorotrifluoroethylene, trifluoroethylene, vinyl fluoride, or vinylidene fluoride.

4. The thin-film composite membrane of claim 2 wherein a precursor to the repeat unit B is a monomer of structure $CF_2=CFOR^fSO_2F$ wherein $R^f$ is a perfluoroalkylene group of 1 to 10 carbon atoms.

5. The thin-film composite membrane of claim 4, wherein the perfluoroalkylene group comprises ether oxygens.

6. The thin-film composite membrane of claim 1 wherein a precursor to the ionomer in the gas-separation layer is a copolymer comprising tetrafluoroethylene and $CF_2$=$CFOCF_2CF_2SO_2F$.

7. The thin-film composite membrane of claim 1 wherein a precursor to the ionomer in the gas-separation layer is a copolymer comprising tetrafluoroethylene and $CF_2$=$CFOCF_2CF(CF_3)OCF_2CF_2SO_2F$.

8. The thin-film composite membrane of claim 1 wherein the ionomer has an equivalent weight that is less than 800-grams/mole.

9. The thin-film composite membrane of claim 1 wherein the gas-separation layer has a thickness that is less than 2-μm wherein at least 50% of the gas-separation layer extends on top of the porous-layer support and is not interpenetrating into the porous-layer support.

10. A spiral wound gas-separation module comprising the thin-film composite membrane of claim 1.

11. A method of constructing a thin-film composite membrane comprising:
providing a porous-layer support and an ionomer solution comprising a solvent and sulfonate groups, selected from: silver sulfonate, sulfonic acid, or non-silver sulfonate;
contacting the porous-layer support with said ionomer solution comprising sulfonate groups; and
removal of the solvent contained in the ionomer solution to form a gas-separation layer that is coplanar and in direct contact to said porous-layer support; and
treatment of the gas-separation layer comprising sulfonic acid or non-silver sulfonate groups with a solution comprising water and at least one dissolved silver compound to convert at least some of the sulfonic acid or non-silver sulfonate groups to silver sulfonate groups; and
wherein the gas-separation layer is formed from said ionomer solution that is substantially free of dissolved ionic species not associated with an ionomer in the ionomer solution and a mean helium permeability of the thin-film composite membrane is less than two times greater than an intrinsic helium permeability of the gas-separation layer.

12. The method of claim 11 wherein the thin-film composite membrane is subjected to a thermal treatment step.

13. The method of claim 11 in wherein the ionomer is comprised of repeat units A and B in which A is a polymerized derivative of a fluorinated monomer and B comprises sulfonate groups.

14. The method of claim 13 wherein repeat unit A is selected from a group consisting of: tetrafluoroethylene, chlorotrifluoroethylene, trifluoroethylene, vinyl fluoride, or vinylidene fluoride.

15. The method of claim 13 wherein a precursor to repeat unit B is a monomer of structure $CF_2$=$CFOR^fSO_2F$ wherein $R^f$ is a perfluoroalkylene group of 1 to 10 carbon atoms.

16. The method of claim 15 wherein the perfluoroalkylene group comprises ether oxygens.

17. The method of claim 11 wherein a precursor to the ionomer is a copolymer comprising tetrafluoroethylene and $CF_2$=$CFOCF_2CF_2SO_2F$.

18. A method for separating a gaseous composition comprising an alkene using a thin-film composite membrane, and comprising:
a) constructing a thin-film composite membrane according to claim 15; the membrane having a feed side and a permeate side; and
b) exposing the feed-side to a flowing gaseous feed-side composition comprising an alkene; and
c) providing a driving force and producing a gaseous permeate-side composition at the permeate-side of the thin-film composite membrane having a higher concentration of alkene than the feed-side.

19. The method of claim 18 wherein the alkene is selected from a group consisting of: ethylene, propylene, butene, or butene isomers.

20. The method of claim 18 wherein the gaseous feed mixture comprises an alkane selected from a group consisting of: methane, ethane, propane, butane, or butane isomers.

21. The method of claim 18 wherein the gaseous feed mixture comprises a non-hydrocarbon gas selected from a group consisting of: helium, hydrogen, nitrogen, oxygen, or argon.

* * * * *